Hans Gruschke
Walter Hammerschick
Heinz Medem
INVENTORS

United States Patent Office 3,403,115
Patented Sept. 24, 1968

3,403,115
PROCESS FOR DEPOLYMERIZING POLYETHYL-
ENE - TEREPHTHALATE TO TEREPHTHALIC
ACID DIMETHYL ESTER
Hans Gruschke, Neuenhain, Taunus, Walter Hammerschick, Bad Nauheim, and Heinz Medem, Offenbach (Main), Germany, assignors to Farbwerke Hoechst Aktiengesellschaft vormals Meister Lucius & Bruning, Frankfurt am Main, Germany
Filed Feb. 16, 1965, Ser. No. 432,949
Claims priority, application Germany, Feb. 18, 1964,
F 42,031
1 Claim. (Cl. 260—2.3)

ABSTRACT OF THE DISCLOSURE

A process is provided for the depolymerizing of polyethylene terephthalate to terephthalic dimethyl ester in a two-stage reaction whereby in the first stage polyethylene terephthalate is heated together with an excess amount of methanol while the admixed components are being stirred during an average residence time in a reactor for 7 to 13 minutes while at a temperature of 190° to 210° C. and at a pressure of 30 to 40 atmospheres. After leaving the first reaction stage, the mixture is introduced into a second stage where it slowly ascends through a second reactor without stirring. The temperature in the second stage is at 180° to 200° C. while the pressure is about equal to that in the first stage. Thereafter, the mixture is introduced into a third reactor, the pressure released and the mixture cooled and processed in such a manner as to yield more than 99% of the theoretical amount of dimethyl terephthalate.

Figure 1:
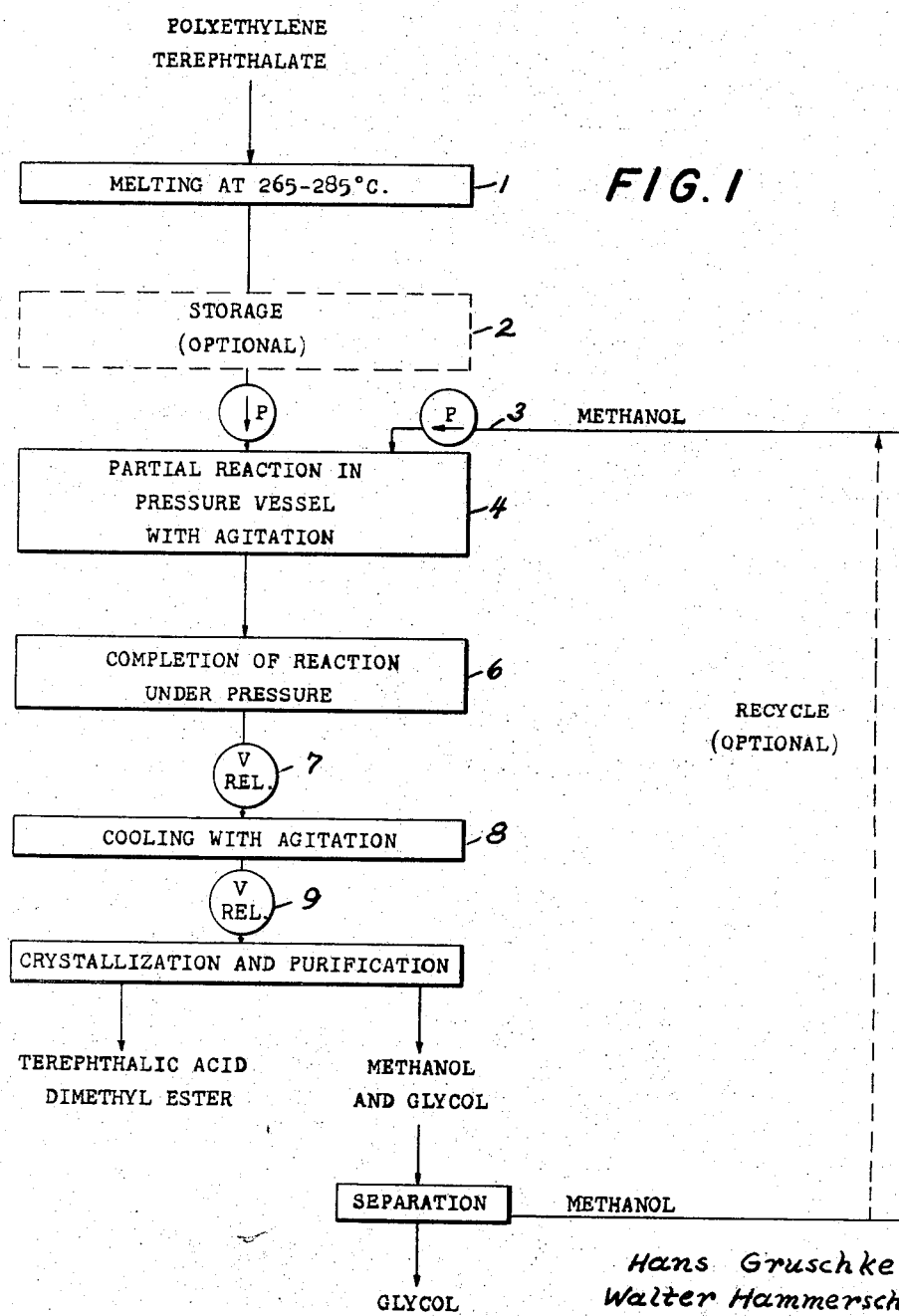

It is known to manufacture terephthalic acid esters by depolymerization of polyesters of terephthalic acid.

Polyethylene terephthalate is depolymerized to terephthalic acid, for example, by means of strong mineral acids. The terephthalic acid thus obtained is purified and esterified in further working stages and then separated in the form of the ester. However, this process is rather complicated and uneconomical.

According to another process polyethylene terephthalate is reacted with boiling glycol to yield terephthalic acid diglycol ester. It is a disadvantage of the latter process that the purification of the terephthalic acid diglycol ester obtained is very cumbersome. The depolymerization of polyesters of terephthalic acid is used in the first place for working up industrial polyester waste and, therefore, it only offers economic advantages if the waste is relatively pure, which is very seldom the case.

It is likewise known to react polyethylene terephthalate with methanol to terephthalic acid dimethyl ester. This method for working up polyester waste has gained the greatest interest in industry because the reaction with methanol directly yields the starting product of the manufacture of polyesters. A number of variants of this reaction are known. The most troublesome difficulty resides in that in the reaction of polyethylene terephthalate with methanol to terephthalic acid dimethyl ester the reaction product obtained must be very pure. If it contains nondepolymerized products or partially depolymerized products the polyethylene terephthalate made therefrom has a poor quality. Mechanical impurities, too, must be removed. The individual processes differ in the mode of operation to solve the problem.

Attempts have been made to comminute the starting material, namely the polyester waste, as far as possible. It is desirable to use the waste in the form of a powder. A known process for pulverizing polyester waste consists in an alkaline treatment in the presence of amines having a dissociation constant above $10^{-5}$. This process yields a powdery polyester but a contamination of the methanol with foreign substances must be put up with so that an additional purification is required.

Still other processes for comminuting the waste provide a treatment of the waste with overheated steam. In this case fine-grained depolymerization products are obtained when the fiber waste is treated with overheated steam in countercurrent flow at atmospheric pressure and subsequently pulverized by mechanical means.

In this process the waste is comminuted but nevertheless it is present in solid form. The subsequent depolymerization reaction must be carried out discontinuously or the comminuted but solid waste must be transferred into the reaction vessel which is under pressure by means of devices requiring very high forces and involving a high wear of material.

The aforesaid difficulties can be avoided by using a process in which the polyester waste is first melted and then reacted with methanol. A comminution of the material alone, either by mechanical means or by melting, does not allow of a sufficiently high conversion of the starting material to terephthalic acid dimethyl ester. Endeavors to obtain as high a conversion of the polyester to terephthalic acid dimethyl ester as possible and to promote the said conversion have led to the development of processes using methanol under conditions which are above the critical range. Owing to the high pressure, the danger of explosion and the danger of decomposition of the methanol, processes of this kind are dangerous and require precautions.

Moreover, a process is known in which the conversion and the reaction speed are increased by carrying out the reaction of the polyethylene terephthalate with the methanol under turbulent conditions of flow in a high pressure tube a small internal diameter, for example a diameter of 16 millimeters, with stepwise reduction of the pressure with the aid of pressure reducing devices installed at regular intervals. In this mode of operation high reaction speeds are reached but due to the turbulent flow the spectrum of the residence time is very broad so that unreacted material is admixed with the final product. An additional disadvantage resides in the fact that the mechanical constituents contained in the waste products readily obstruct the thin tubes.

It is the object of the present invention to provide a process for depolymerizing polyester waste with methanol to obtain terephthalic acid dimethyl ester.

Polyethylene terephthalate waste is melted, mixed in the molten state with an excess of methanol and reacted at a temperature below the critical temperature of methanol. The reaction proceeds at a sufficient speed at a temperature in the range of from 160° C. to 240° C. under a pressure of 20 to 70 atmospheres gauge. When the reaction is performed in this manner the degree of conversion amounts to 98% and in some cases to 99%, calculated on the starting material. However, a degree of conversion of 99% cannot be considered satisfactory when polyethylene terephthalate of high quality is to be produced from the terephthalic acid dimethyl ester thus obtained.

It has now been found that satisfactory results can be obtained when the aforesaid process, in which polyester waste is first melted, mixed in the molten state with 2 to 8 times the amount of methanol and, if desired, a catalyst, and reacted at a temperature in the range of from 160° C. to 240° C. and under a pressure of 20 to 70 atmospheres, is carried out in two stages.

The first stage of the reaction is carried out in an autoclave with stirring means in which the liquid components are mixed with one another and in which a partial reaction is brought about by limiting the residence time to an average of about 10 minutes.

The second stage of the reaction is carried out under the same pressure conditions and at a slightly lower temperature in a reaction tube into which the partially reacted mixture from the stirring autoclave flows through an overflow and an immersion tube reaching to the bottom of the said reaction tube. The reaction mixture slowly ascends in the reaction tube without being stirred whereby the reaction of the mixture is completed.

The pressure of the methanolic solution of the reaction product is then released to 3 atmospheres gauge, the solution is transferred into a stirring vessel having an internal temperature of 100° C., the pressure is released to normal and the mixture is worked up in known manner.

When operating in this manner a degree of conversion of over 99% is obtained. In most cases the reaction product is so pure that with the customery chemical analytical methods polyethylene terephthalate or a degradation product of low molecular weight cannot be detected. The prerequisite to the high degree of conversion is that in the reaction tube of the second stage the reaction mixture slowly flows upwardly without turbulence. In this manner a mixing of the reaction zones is avoided. The spectrum of the residence time becomes very narrow so that no unreacted material leaves the reaction tube. In order to achieve this, the reaction tube used must be rather wide, an internal diameter of about 30 to 100 centimeters being preferred. A further advantage is that the contaminations, which mostly have a higher specific gravity than the reaction mixture, collect at the bottom of the reaction tube where they may be drawn off at intervals. A further characteristic of the process of the invention is the pressure release of the reacted mixture to 3 atmospheres gauge and the cooling of the released mixture in a stirring vessel to 100° C. A precipitation of the reaction product does not yet take place under these conditions.

The process of the invention is further illustrated by way of example with reference to the accompanying drawings. FIGURE 1 is a flow diagram of the total process of deploymerization and FIGURE 2 shows the steps of the invention.

Polyester waste is melted in a reaction vessel 1 at a temperature of 240 to 320° C. It is advantageous to melt the polyester waste at a temperature in the range of from 265° C. to 285° C. A reservoir 2 is suitably installed between melting vessel 1 and reaction vessel 4 in order to compensate variations in the supply of the polyester waste. The molten polyethylene terephthalate is transferred from reservoir 2 into reaction vessel 4. Simultaneously methanol is introduced into vessel 4 through tube 3. It is advantageous to heat the methanol approximately to the reaction temperature before introduction into vessel 4. The ratio by weight of polyethylene terephthalate to the methanol used for the ester interchange reaction shall vary between 1:3 and 1:5. A ratio by weight of 1:4 has proved to be especially advantageous. In reaction vessel 4 polyethylene terephthalate and methanol are intimately mixed with one another. The temperature in the vessel shall amount to 190 to 210° C. whereby a pressure of 30 to 40 atmospheres gauge is obtained. The velocity of flow in the stationary state in vessel 4 is so adjusted that the average residence time is 7 to 13 minutes. In the mixture leaving reaction vessel 4 70 to 90% of the starting material have been reacted to terephthalic acid dimethyl ester. Vessel 4 is provided at the upper end with an overflow. The reaction mixture flows through the overflow and an immersion tube into a second autoclave 6 having the form of a tube where it leaves the immersion tube at the lower end. The immersion tube has an internal diameter of at least 10 centimeters. The reaction mixture ascends slowly in the second autoclave at a rate of 5–10 cm./min. without mixing occurring. The temperature in the large reaction tube is a little lower than in the vessel of the first stage because no additional heat is supplied. The temperature drops in the course of the reaction by about 10° C. only so that in the reaction tube a temperature of 180–200° C. prevails. The pressure in the reaction tube is as high as the pressure in the reaction vessel since pressure compensation is brought about by means of connecting tube 5. The pressure of the reacted mixture is released to 3 atmospheres gauge by means of release valve 7 and the mixture is conducted to a further stirring vessel 8 where the methanolic solution of the terephthalic acid dimethyl ester is cooled to 100° C. At this temperature terephthalic acid dimethyl ester does not yet precipitate. The pressure is further released by means of release valve 9 and the solution is cooled and the dimethyl terephthalate formed in filtered off, washed with fresh methanol, suspended again in fresh methanol and separated by centrifugation. The pure dimethyl terephthalate thus obtained is again conducted to the ester interchange reaction with glycol and subjected to polycondensation, while the mother liquor and the wash methanol are worked up by distillation. The methanol obtained can be reused in the reaction so that the process is economic in spite of the high excess of methanol used.

Figure 2:
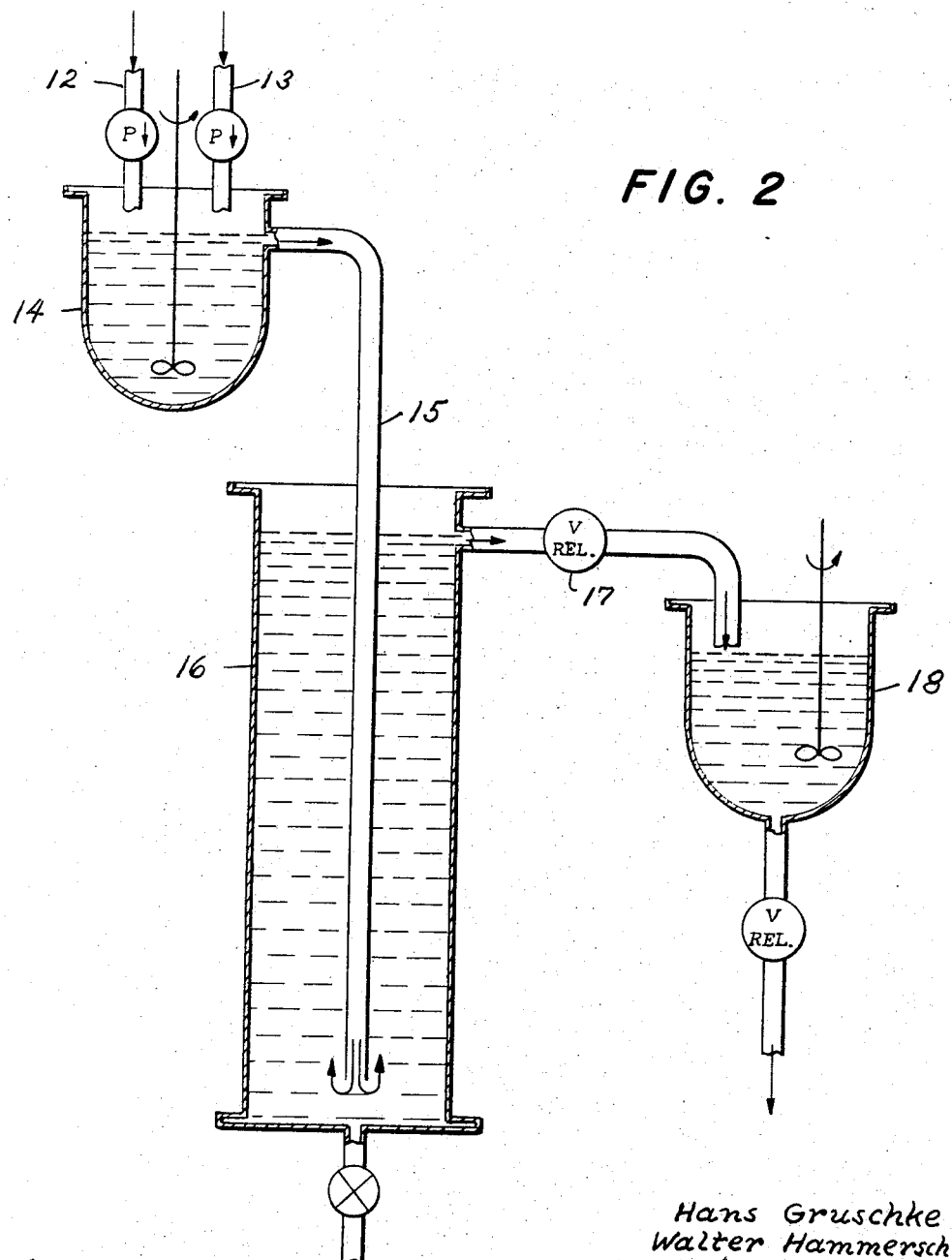

FIGURE 2 is given to further illustrate the main characteristics of the process of the invention in comparison with the state of the art.

Methanol heated to 200° C. and molten polyethylene terephthalate are supplied through tubes 12 and 13 into vessel 14. In the vessel the constituents are mixed, they partially react with one another and flow through the wide overflow 15 to the bottom of reaction tube 16. The reaction mixture slowly ascends in the reaction tube, the completely reacted mixture leaves the reaction tube through valve 17 and travels into vessel 18 where it is cooled to 100° C. while stirring. The liquid reaction product is withdrawn from vessel 18 and further processed.

The depolymerization process of the invention can be carried out without the addition of catalyst. However, the presence of the usual ester interchange catalysts shortens the duration of the ester interchange reaction. Suitable catalysts are zinc acetate, manganese acetate, manganese phosphate, calcium phosphate, alkali metal oxides, alkaline earth metal oxides, alkali metal hydroxides, alkaline earth metal hydroxides, as well as sodium silicate and lead oxide.

On principle, polyester waste which has not been melted but finely comminuted according to a known process can be depolymerized by the process of the invention. In this case it is suitable to prolong the residence time in the second reaction stage.

The following example serves to illustrate the invention but it is not intended to limit it thereto.

Example

A vessel heated with diphenyl and provided with immersion or screw pump was charged at an internal temperature of 285° C. and in the course of 24 hours with 15 tons of polyester waste in the form of ribbons, fibers, foils and chips, and the waste was melted.

The melt was then forced or pumped by means of nitrogen into a second vessel provided with a stirrer and having an internal temperature of 250–270° C. By means of a screw pump the polyester melt was transferred into an autoclave while methanol heated to 200° C. was simultaneously metered into the same vessel by means of a metering pump.

The conveyed amount was regulated in a manner such that 400 kilograms of molten polyethylene terephthalate and 1600 kilograms of methanol were introduced into the reaction vessel within 1 hour. In the reaction vessel a pressure of 30 to 40 atmospheres gauge and a temperature of 210° C. were obtained. At the upper end of the autoclave an overflow was provided for so that after about 10 minutes the reaction mixture flowed through an immersion tube into a second autoclave where it left the immersion tube at the lower end of said autoclave. Since this vessel, too, had an overflow at the upper end the reaction mixture flowed upward at a temperature of 200°

C. and under a pressure of 30–40 atmospheres gauge. After having left the second autoclave the pressure of the reaction products was released over a valve to 3 atmospheres gauge and the products were passed into a stirring vessel having an internal temperature of 100° C. From there the reaction product was conveyed in portions through heated tubes into stirring vessels, the pressure was released in known manner to atmospheric pressure, the motor liquor was filtered off, the reaction product was washed with fresh methanol, suspended and separated by centrifugation.

A dimethyl terephthalate was obtained which could be condensed by a conventional method to give polyethylene terephthalate. The polyester could be spun to filaments of high quality.

We claim:

1. In a process for depolymerizing polyethylene terephthalic acid dimethyl ester wherein polyethylene terephthalate waste is melted, mixed with methanol and the mixture is reacted in two stages at an elevated temperature and pressure to yield terephthalic dimethyl ester, the improvement comprising the steps of: heating in the first stage at a temperature of 190° to 210° C. and under a pressure of 30 to 40 atmospheres molten polyethylene terephthalate with methanol in the ratio by weight of polyethylene terephthalate to methanol in the range of 1:3 to 1:5 while stirring the mixture until a conversion of 70 to 90% of the polyethylene terephthalate to dimethyl terephthalate is reached during average residence time of 7 to 13 minutes in the first stage; introducing in a second stage the reaction mixture from the first stage and without stirring in said second stage passing the mixture slowly upwardly through the second reaction stage at a temperature of 180° to 200° C. and at a pressure substantially equivalent to that of the first stage; recovering the dimethyl terephthalate by decreasing to about 3 atmospheres the pressure of dimethyl terephthalate and methanol solution leaving the second stage while stirring and cooling the solution to 100° C.; releasing the pressure to atmospheric pressure; and crystallizing and purifying the dimethyl terephthalate obtained.

References Cited

FOREIGN PATENTS 166,184  10/1953  Australia.

MURRAY TILLMAN, *Primary Examiner.*

M. J. TULLY, *Assistant Examiner.*